United States Patent
Zhou et al.

(10) Patent No.: US 12,251,817 B2
(45) Date of Patent: Mar. 18, 2025

(54) DEVICE, SYSTEM AND METHOD FOR ACQUIRING FORCE INFORMATION BASED ON BIONIC STRUCTURE

(71) Applicant: Institute of Automation, Chinese Academy of Sciences, Beijing (CN)

(72) Inventors: Xiaohu Zhou, Beijing (CN); Zengguang Hou, Beijing (CN); Meijiang Gui, Beijing (CN); Xiaoliang Xie, Beijing (CN); Shiqi Liu, Beijing (CN); Zhenqiu Feng, Beijing (CN); Yanjie Zhou, Beijing (CN); Lingwu Meng, Beijing (CN); Hao Li, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 347 days.

(21) Appl. No.: 17/751,920

(22) Filed: May 24, 2022

(65) Prior Publication Data
US 2022/0379490 A1    Dec. 1, 2022

(30) Foreign Application Priority Data

May 31, 2021    (CN) .......................... 202110605003.8

(51) Int. Cl.
*G01L 5/22* (2006.01)
*B25J 13/08* (2006.01)
*G01L 1/12* (2006.01)

(52) U.S. Cl.
CPC ............ *B25J 13/082* (2013.01); *G01L 1/122* (2013.01); *G01L 5/228* (2013.01)

(58) Field of Classification Search
CPC ....... B25J 13/082; B25J 13/084; G01L 1/122; G01L 5/228; G01L 5/169; G01L 1/127
(Continued)

(56) References Cited

U.S. PATENT DOCUMENTS

| 5,325,869 A | 7/1994 | Stokes |
| 2002/0079888 A1 | 6/2002 | Frissen et al. |

(Continued)

FOREIGN PATENT DOCUMENTS

| CA | 2607449 A1 * | 11/2006 | ................ A61J 1/20 |
| CN | 1539604 A | 10/2004 | |

(Continued)

OTHER PUBLICATIONS

Chinese Office Action for CN Application No. 202110605003.8 (33 pages, with English translation).

*Primary Examiner* — Robert R Raevis
(74) *Attorney, Agent, or Firm* — Merchant & Gould P.C.

(57) ABSTRACT

Provided are a device, a system and a method for acquiring a force information based on a bionic structure, including: a force information acquisition layer and a magnetic field signal acquisition chip; wherein a permanent magnet is embedded in the force information acquisition layer; wherein the force information acquisition layer has an elastic structure configured to generate a deformation corresponding to a first force information of a force after being subjected to the force, so that the permanent magnet moves with the deformation to generate a magnetic field signal corresponding to the force information; wherein the magnetic field signal acquisition chip is arranged in parallel with the force information acquisition layer, and is configured to acquire the magnetic field signal and convert the magnetic field signal into an electrical signal.

7 Claims, 2 Drawing Sheets

(58) Field of Classification Search
USPC ............. 73/779, 862.041, 862.042, 862.043,
73/862.046, 862.06, 862.381, 862.541,
73/862.542, 862.621, 862.625,
73/862.636–862.638, 862.69, 865.7;
324/207.11–207.14, 207.2, 207.22, 207.24
See application file for complete search history.

(56) References Cited

U.S. PATENT DOCUMENTS

| | | |
|---|---|---|
| 2008/0036456 A1 | 2/2008 | Kishida et al. |
| 2009/0320611 A1 | 12/2009 | Vásárhelyi et al. |
| 2016/0265985 A1 | 9/2016 | Onal et al. |

FOREIGN PATENT DOCUMENTS

| | | | | |
|---|---|---|---|---|
| CN | 104919271 A | | 9/2015 | |
| CN | 106153105 A | * | 11/2016 | ......... A46B 15/0012 |
| DE | 20201210489 U1 | | 3/2014 | |
| EP | 2988107 A1 | | 2/2016 | |
| WO | WO-2020170771 A1 | * | 8/2020 | ............... G01L 1/12 |

* cited by examiner

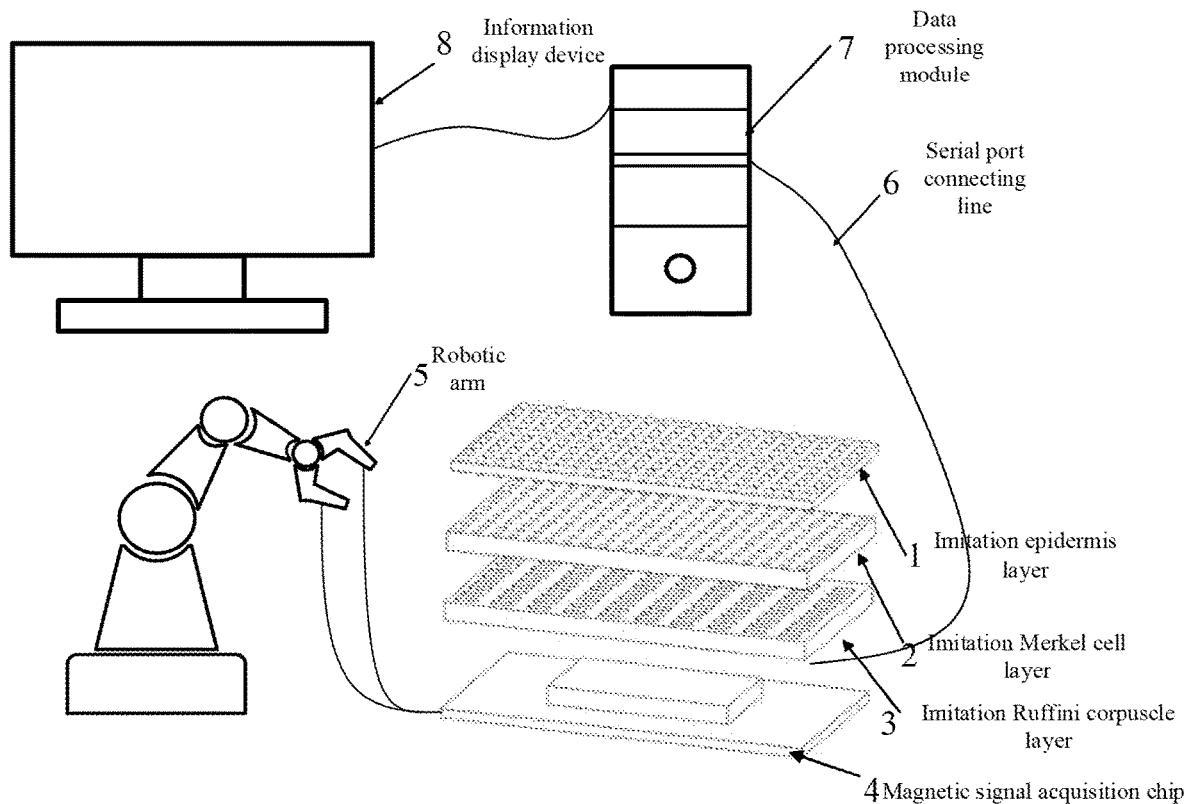

FIG. 3

```
A deformation corresponding to a first force information of a force is generated after
a force information acquisition layer of a device for acquiring a force
information is subjected to the force, so that a permanent magnet in the force      ~410
information acquisition layer moves with the deformation to generate a magnetic
field signal corresponding to the force information
                                          ↓
A magnetic field signal is acquired, and the magnetic field signal is converted into an
electrical signal through a magnetic field signal acquisition chip of the device for      ~420
acquiring a force information
```

FIG. 4

DEVICE, SYSTEM AND METHOD FOR ACQUIRING FORCE INFORMATION BASED ON BIONIC STRUCTURE

CROSS-REFERENCE TO RELATED APPLICATION

This application claims the priority of Chinese Patent Application No. 202110605003.8 filed on May 31, 2021 in the China National Intellectual Property Administration, the content of which is incorporated herein by reference in entirety.

TECHNICAL FIELD

The present disclosure relates to a field of sensor technology, and in particular, to a device, a system and a method for acquiring a force information based on a bionic structure.

BACKGROUND

With the development of information technology, robots have been widely used in industrial production, emergency rescue and disaster relief, medical care and other fields due to their programmable, controllable, reliable and other characteristics. Enhancing the robot's ability to perceive an external stimulus has also become a research hotspot in the field. Existing methods perceive the external stimulus through a force sensor mounted on the robot.

However, in the prior art, when being used to perceive a multi-dimensional force, a perceiving mechanism may be too bulky and complicated in structure, which is inconvenient for installation and use, and a sensing accuracy is insufficient.

SUMMARY

Provided are a device, a system and a method for acquiring a force information based on a bionic structure.

In a first aspect, a force information acquisition device based on a bionic structure is provided, including:
  a force information acquisition layer and a magnetic field signal acquisition chip;
  wherein a permanent magnet is embedded in the force information acquisition layer;
  wherein the force information acquisition layer has an elastic structure configured to generate a deformation corresponding to a first force information of a force after being subjected to the force, so that the permanent magnet moves with the deformation to generate a magnetic field signal corresponding to the force information;
  wherein the magnetic field signal acquisition chip is arranged in parallel with the force information acquisition layer, and is configured to acquire the magnetic field signal and convert the magnetic field signal into an electrical signal.

Optionally, the force information acquisition layer includes an imitation Merkel cell layer and/or an imitation Ruffini corpuscle layer;
  wherein the imitation Merkel cell layer is configured to generate a deformation corresponding to a second force information of a normal force after being acted by the normal force, so that a permanent magnet in the imitation Merkel cell layer moves with the deformation to generate a magnetic field signal corresponding to the second force information;
  wherein the imitation Ruffini corpuscle layer is configured to generate a deformation corresponding to a third force information of a tangential force after being acted by the tangential force, so that a permanent magnet in the imitation Ruffini corpuscle layer moves with the deformation to generate a magnetic field signal corresponding to the third force information.

Optionally, the force information acquisition layer further includes: an imitation epidermis layer;
  wherein the imitation epidermis layer covers an outside of the imitation Merkel cell layer and/or the imitation Ruffini corpuscle layer, an outer surface of the imitation epidermis layer includes a plurality of protrusions; and the imitation epidermis layer is configured to transmit a force to the imitation Merkel cell layer and/or the imitation Ruffini corpuscle layer after being subjected to the force.

Optionally, the force information acquisition layer is made of a liquid silicone rubber;
  wherein a hardness of the imitation epidermis layer is greater than a hardness of the imitation Merkel cell layer and/or the imitation Ruffini corpuscle layer.

In a second aspect, a force information acquisition system based on a bionic structure is provided, wherein the system includes the force information acquisition device based on a bionic structure as described in the first aspect;
  wherein the system further includes: a robotic arm, a serial port connecting line, a data processing device and a force information display device;
  wherein the robotic arm is configured to connect the magnetic field signal acquisition chip.
  wherein the serial port connecting line is connected with the magnetic field signal acquisition chip, the serial port connecting line is connected with the data processing device, and the serial port connecting line is configured to transmit an electrical signal converted by the magnetic field signal acquisition chip to the data processing device.
  wherein the data processing device is configured to determine a display information of a first force information based on the electrical signal, and transmit the display information to the force information display device.
  wherein the force information display device is configured to display the display information of the first force information.

In a third aspect, a method of acquiring a force information based on a bionic structure is provided, including:
  generating a deformation corresponding to a first force information of a force after a force information acquisition layer of a device for acquiring a force information based on a bionic structure being subjected to the force, so that a permanent magnet in the force information acquisition layer moves with the deformation to generate a magnetic field signal corresponding to the force information;
  acquiring the magnetic field signal and converting the magnetic field signal into an electrical signal, through a magnetic field signal acquisition chip of the device for acquiring a force information based on a bionic structure.

Optionally, the force information acquisition layer includes an imitation Merkel cells layer and/or an imitation Ruffini corpuscle layer;
  correspondingly, the "generating a deformation corresponding to a first force information of a force after a force information acquisition layer being subjected to the force, so that a permanent magnet in the force information acquisition layer moves with the deformation to generate a magnetic field signal corresponding to the force information" includes at least one of:

the imitation Merkel cell layer is configured to generate a deformation corresponding to a second force information of a normal force after being acted by a normal force, so that the permanent magnets in the imitation Merkel cell layer moves with the deformation to generate a magnetic field signal corresponding to the second force information;

the imitation Ruffini corpuscle layer is configured to generate a deformation corresponding to a third force information of a tangential force after being acted by the tangential force, so that a permanent magnet in the imitation Ruffini corpuscle layer moves with the deformation to generate a magnetic field signal corresponding to the third force information.

Optionally, the force information acquisition layer further includes: an imitation epidermis layer, and the imitation epidermis layer enhances a force through a plurality of protrusions on an outer surface of the imitation epidermis layer after being subjected to the force;

the enhanced force is transmitted to the imitation Merkel cells layer and/or the imitation Ruffini corpuscle layer.

Optionally, the method further includes:

transmitting the electrical signal to a signal processing unit through a serial port connecting line;

determining a display information of the first force information based on the electrical signal through a data processing device, and transmitting the display information to a force information display device;

displaying the display information of the first force information through the force information display device.

Optionally, the method further includes: connecting the magnetic field acquisition chip through a robotic arm.

BRIEF DESCRIPTION OF THE DRAWINGS

In order to explain the present disclosure or a technical solution in the prior art more clearly, in the following, accompanying drawings to be used in the description of embodiments of the present disclosure or the prior art will be introduced briefly. Obviously, the accompanying drawings described below are some embodiments of the present disclosure, and those of ordinary skill in the art may obtain other drawings according to the drawings without any creative effort.

FIG. 3 is yet another schematic structural diagram of a device for acquiring a force information based on a bionic structure provided by the present disclosure;

FIG. 4 is a schematic flowchart of a method for acquiring a force information based on a bionic structure provided by the present disclosure.

DETAILED DESCRIPTION OF EMBODIMENTS

In order to make objectives, technical solutions and advantages of the present disclosure more apparent, the technical solution in the present disclosure will be clearly and completely described below with reference to the accompanying drawings. Obviously, the described embodiments are part of the embodiments of the present disclosure, rather than all the embodiments. Based on the embodiments of the present disclosure, all other embodiments obtained by those of ordinary skill in the art without creative effort shall fall within the protection scope of the present disclosure.

Robots have been widely used in industrial production, emergency rescue and disaster relief, medical care and other fields due to their programmable, controllable, reliable and other characteristics, playing an increasingly important role in improving social production efficiency, improving people's happiness index, etc. A good force perception ability may enable a safer interaction between the robot and an external environment, thereby greatly improving the robot's ability to perform difficult tasks in a complex environment. Since an external stimulus is generally multi-dimensional and non-linear, a single-dimensional force sensor may not meet relevant requirements. In addition, a traditional sensor installed on the robot may have a great impact on the robot's volume, self-weight and other related indicators.

In order to solve the above problems, the force information acquisition device based on the bionic structure provided by the present disclosure implements an accurate and efficient acquisition and perception of the multi-dimensional force information through a force information acquisition layer.

Figure 1:
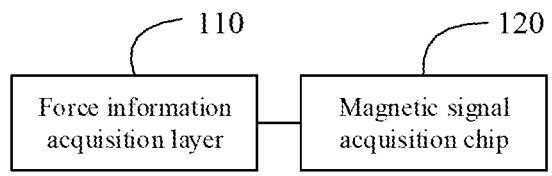
FIG. 1 is a schematic structural diagram of a device for acquiring a force information based on a bionic structure provided by the present disclosure.

FIG. 1 is a schematic structural diagram of a device for acquiring a force information based on a bionic structure provided by the present disclosure. As shown in FIG. 1, the device includes: a force information acquisition layer 110 and a magnetic field signal acquisition chip 120.

A permanent magnet is embedded in the force information acquisition layer 110.

The force information acquisition layer 110 has an elastic structure which is used to generate a deformation corresponding to a first force information of a force after being subjected to the force, so that the permanent magnet moves with the deformation to generate a magnetic field signal corresponding to the force information.

The magnetic field signal acquisition chip 120 is arranged in parallel with the force information acquisition layer 110, the magnetic field signal acquisition chip is used to acquire the magnetic field signal, and convert the magnetic field signal into an electrical signal.

The first force information of the force may be a multi-dimensional force signal including at least one of the following: a magnitude of the force, a direction of the force, a rotation direction of the force, a rotation angle of the force, and a rotation speed of the force.

Optionally, the force information acquisition layer 110 may be an elastic structure, which may generate a corresponding deformation after being acted by a force.

Optionally, the number of permanent magnets in the force information acquisition layer 110 may be one or multiple. The permanent magnets may be embedded in the force information acquisition layer 110 in an array or other manners.

Optionally, when the force information acquisition layer 110 is subjected to a force, a deformation corresponding to the first force information of the force may be generated, so that at least one permanent magnet embedded in the force information acquisition layer moves with the deformation, resulting in a change of a spatial position of the permanent magnet, which in turn causes a magnetic field of the permanent magnet to change, which in turn causes a corresponding magnetic field strength around the permanent magnet to change, and generate a magnetic field signal corresponding to the force information.

Optionally, the magnetic field signal acquisition chip 120 may be arranged in parallel above the force information acquisition layer 110, or may be arranged in parallel below the force information acquisition layer 110.

After the force information acquisition layer 110 generates the magnetic field signal corresponding to the force information, the magnetic field signal acquisition chip 120 may acquire the magnetic field signal and convert the magnetic field signal into an electrical signal.

According to the present disclosure, the force information acquisition layer generates a corresponding deformation after being subjected to a force, the permanent magnet embedded in the force information acquisition layer moves with the deformation, thereby generating a magnetic field signal corresponding to the force information, which may accurately perceive a multi-dimensional information of the force. The magnetic field signal is converted into an electrical signal easily manifested through a magnetic field signal acquisition chip arranged in parallel with the force information acquisition layer, so as to implement an accurate and efficient acquisition and perception of the multi-dimensional force information.

Optionally, the force information acquisition layer includes an imitation Merkel cell layer and/or an imitation Ruffini corpuscle layer.

The imitation Merkel cell layer is used to generate a deformation corresponding to a second force information of a normal force after being acted by the normal force, so that a permanent magnet in the imitation Merkel cell layer moves with the deformation to generate a magnetic field signal corresponding to the second force information;

The imitation Ruffini corpuscle layer is used to generate a deformation corresponding to a third force information of a tangential force after being acted by the tangential force, so that a permanent magnet in the imitation Ruffini corpuscle layer moves with the deformation to generate a magnetic field signal corresponding to the third force information.

Optionally, the normal force may be a force perpendicular to a plane where the magnetic field signal acquisition chip is located. The tangential force may be a force parallel to the plane where the magnetic field signal acquisition chip is located.

Optionally, the force information acquisition layer includes the imitation Merkel cell layer, and the imitation Merkel cell layer is prepared by using a low-hardness liquid silicone rubber material, and the permanent magnet is assembled in a reserved gap through a micromachining process. Morphological and functional properties of Merkel cells in a skin are simulated to perceive an external normal force stimulus.

Optionally, after the imitation Merkel cell layer deforms after being subjected to a normal force, so that a spatial position of the permanent magnet in the imitation Merkel cell layer changes, thereby causing a magnetic induction strength in a direction of the normal force detected by the magnetic field signal acquisition chip to change, thereby generating a magnetic field signal corresponding to the second force information of the normal force.

Optionally, the permanent magnet in the imitation Merkel cell layer may be a cylindrical permanent magnet.

Optionally, a diameter of the cylindrical permanent magnet assembled in the imitation Merkel cell layer may be 1 mm, a height thereof may be 1 mm, a type of a material may be neodymium iron boron (NdFeB) with a strength of N45, and related parameters thereof are shown in table. 1.

TABLE 1

| Material | NdFeB |
|---|---|
| Shape | Disc |
| Diameter | 1 mm |
| Height | 1 mm |
| Tolerance | +/−0.1 mm |
| Direction of magnetisation | axial (parallel to height) |
| Coating | Nickel-plated (Ni—Cu—Ni) |
| Magnetisation | N45 |
| Strength | approx. 31 g (approx. 0.304 N) |
| Displacement force | approx. 6.2 g (approx. 0.0608 N) |
| Max. working temperature | 80° C. |
| Weight | 0.06 g |

Optionally, Table 1 is only used as an example of the parameters of the cylindrical permanent magnet, rather than limiting the cylindrical permanent magnet provided by the present disclosure.

Optionally, at least one cylindrical permanent magnet may be assembled in every 10-20 mm2 area.

Optionally, the cylindrical permanent magnets may be evenly distributed in the imitation Merkel cell layer, so that the imitation Merkel cell layer may perceive the external force stimulus more accurately.

Optionally, the force information acquisition layer includes an imitation Ruffini corpuscle layer, the imitation Ruffini corpuscle layer may be prepared by using a low-hardness liquid silicone rubber material, and a permanent magnet is assembled in a reserved gap through micromachining technology. Morphological and functional properties of Ruffini corpuscles in a skin are simulated to perceive an external normal force stimulus.

Optionally, after the imitation Ruffini corpuscle layer deforms after being subjected to a tangential force, so that a spatial position of the permanent magnet in the imitation Ruffini corpuscle layer changes, thereby causing a magnetic induction strength in a direction of the tangential force detected by the magnetic field signal acquisition chip to change, thereby generating a magnetic field signal corresponding to the third force information of the tangential force.

Optionally, the permanent magnet in the imitation Ruffini corpuscle layer may be an elongated permanent magnet.

Optionally, a length of the elongated permanent magnet assembled in the imitation Ruffini corpuscle layer may be 5 mm, a width thereof may be 1 mm, a height thereof may be 1 mm, a type of a material may be neodymium iron boron (NdFeB) with a strength of N45, and related parameters thereof are shown in table. 2.

TABLE 2

| Material | NdFeB |
|---|---|
| Shape | Block |
| Size | 5 × 1.5 × 1 mm |
| Tolerance | +/−0.1 mm |
| Direction of magnetisation | Axis 1 mm |
| Coating | Nickel-plated (Ni—Cu—Ni) |
| Magnetisation | N45 |
| Strength | approx. 140 g (approx. 1.37 N) |
| Displacement force | approx. 28 g (approx. 0.275 N) |
| Max. working temperature | 80° C. (possibly lower) |
| Weight | 0.057 g |

Optionally, Table 2 is only used as an example of the parameters of the elongated permanent magnet, rather than limiting the elongated permanent magnet provided by the present disclosure.

Optionally, at least one elongated permanent magnet may be assembled in every 40-50 mm2 area.

Optionally, the elongated permanent magnets may be evenly distributed on the imitation Ruffini corpuscle layer, so that the imitation Ruffini corpuscle layer may perceive the external force stimulus more accurately.

Figure 2:
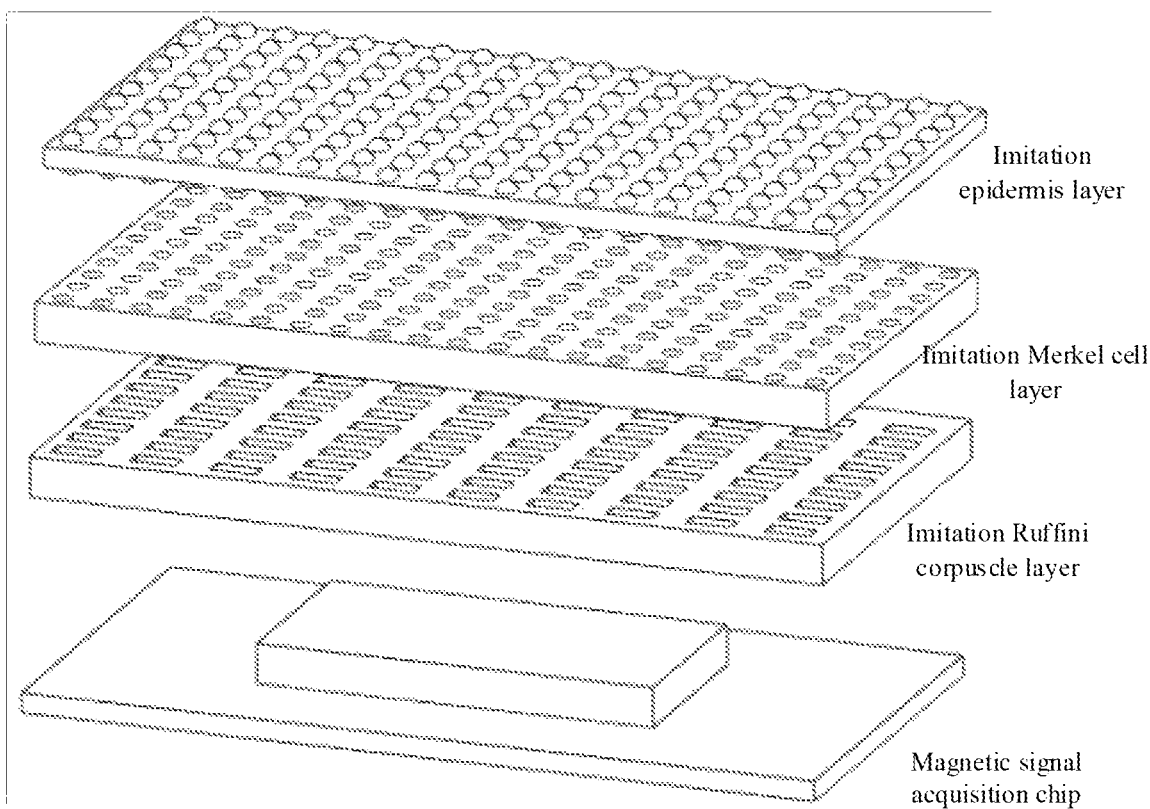
FIG. 2 is another schematic structural diagram of a device for acquiring a force information based on a bionic structure provided by the present disclosure.

Optionally, as shown in FIG. 2, FIG. 2 is another schematic structural diagram of a device for acquiring a force information based on a bionic structure provided by the present disclosure.

A force information acquisition layer includes an imitation Merkel cell layer and an imitation Ruffini corpuscle layer. When a normal force is perceived, the imitation Merkel cell layer may generate a deformation, a spatial position of a permanent magnet in the imitation Merkel cell layer changes, thereby causing a magnetic induction strength of the normal force to change, thereby generating a magnetic field signal corresponding to the second force information of the normal force. When a tangential force is perceived, the imitation Ruffini corpuscle layer below the imitation Merkel cell layer may generate a deformation, a spatial position of the permanent magnet in the imitation Ruffini corpuscle layer changes, thereby causing a magnetic induction strength of the tangential force to change, thereby generating a magnetic field signal corresponding to the third force information of the tangential force.

Optionally, the imitation Merkel cell layer may also be located below the imitation Ruffini corpuscle layer.

In the present disclosure, morphological and high-performance characteristics of a human skin sensory corpuscle are simulated by using the imitation Merkel cell layer and/or the imitation Ruffini corpuscle layer, and a micromachining technology is used in combination to implement a more accurate perception of the external multi-dimensional, non-linear force stimulus.

Optionally, the force information acquisition layer further includes: an imitation epidermis layer.

The imitation epidermis layer covers an outside of the imitation Merkel cell layer and/or the imitation Ruffini corpuscle layer, and an outer surface of the imitation epidermis layer includes a plurality of protrusions; and the imitation epidermis layer is used to transmit a force to the imitation Merkel cell layer and/or the imitation Ruffini corpuscle layer after being subjected to the force.

Optionally, the imitation epidermis layer may cover the outside of the imitation Merkel cell layer and/or the imitation Ruffini corpuscle layer. When the external environment exerts a force stimulus on the imitation epidermis layer, the imitation epidermis layer may generate a deformation, the external force stimulus is enhanced through a deformation of the protrusion on the imitation epidermis layer and transmitted downwardly to the imitation Merkel cell layer and/or the imitation Ruffini corpuscle layer.

Optionally, the imitation epidermis layer may also have a fine double-sided protrusion, which is used to simulate morphological and functional characteristics of a skin epidermis layer, and the double-sided protrusion may amplify a deformation of the imitation epidermis layer, thereby enhancing a perception of the force.

In the present disclosure, the morphological and functional characteristics of the human skin epidermis layer is simulated by using the imitation epidermis layer with the double-sided protrusion, which may amplify the deformation, thereby amplifying the perception of the force, enhancing the force received by the imitation epidermis layer, and transmitting the force to the imitation Merkel cell layer and/or the imitation Ruffini corpuscle layer, which improves the perception of the external force stimulus, thereby improving the accuracy of the perceived force information.

Optionally, the force information acquisition layer is made of a liquid silicone rubber;
a hardness of the imitation epidermis layer is greater than a hardness of the imitation Merkel cell layer and/or the imitation Ruffini corpuscle layer.

Optionally, the force information acquisition layer may be made of a liquid silicone rubber, and the force information acquisition layer has an elastic structure, so that the force information acquisition layer may generate a deformation when being subjected to a force, so as to better perceive the force information.

Optionally, the imitation epidermis layer may be prepared by using a high hardness liquid silicone rubber material.

For example, the high hardness liquid silicone rubber of the imitation epidermis layer may be Ecoflex 00-50 with a Shore hardness of Shore 00-50. Material-related parameters of Ecoflex 00-50 are shown in Table 3.

TABLE 3

| Specific Gravity | 1.07 g/cc |
|---|---|
| Specific Volume | 25.9 cu. in./lb. |
| Pot Life | 18 minutes |
| Cure Time | 3 hours |
| Shore Hardness | 00-50 |
| Tensile Strength | 315 psi |
| 100% Modulus | 12 psi |
| Elongation @ Break | 980% |
| Die B Tear Strength | 50 pli |
| Shrinkage | <.001 in./in. |
| Mix Ratio By Volume | 1A:1B |
| Mix Ratio By Weight | 1A:1B |
| Color | Translucent |
| Useful Temperature (min) | −65° F. |
| Useful Temperature (max) | 450° F. |
| Mixed Viscosity | 8,000 cps |

Optionally, Table 3 is only used as an example of the parameters of the high hardness liquid silicone rubber of the imitation epidermis layer, rather than limiting the high hardness liquid silicone rubber of the imitation epidermis layer provided by the present disclosure.

Optionally, the imitation Merkel cell layer and the imitation Ruffini corpuscle layer may be prepared by using a low hardness liquid silicone rubber material.

For example, the low hardness liquid silicone rubber of the imitation Merkel cell layer and the imitation Ruffini corpuscle layer may be Ecoflex 00-30 with a Shore hardness of Shore 00-30. Material-related parameters of Shore 00-30 are shown in Table 4.

TABLE 4

| Specific Gravity | 1.07 g/cc |
|---|---|
| Specific Volume | 26.0 cu. in./lb. |
| Pot Life | 45 minutes |
| Cure Time | 4 hours |
| Shore Hardness | 00-30 |
| Tensile Strength | 200 psi |
| 100% Modulus | 10 psi |
| Elongation @ Break | 900% |
| Die B Tear Strength | 38 pli |
| Shrinkage | <.001 in./in. |
| Mix Ratio By Volume | 1A:1B |
| Mix Ratio By Weight | 1A:1B |
| Color | Translucent |
| Useful Temperature (min) | −65° F. |
| Useful Temperature (max) | 450° F. |
| Mixed Viscosity | 3,000 cps |

Optionally, Table 4 is only used as an example of the parameters of the low hardness liquid silicone rubber of the imitation Merkel cell layer and the imitation Ruffini corpuscle layer, rather than limiting the low hardness liquid silicone rubber of the imitation Merkel cell layer and the imitation Ruffini corpuscle layer provided by the present disclosure.

Optionally, a hardness of the imitation epidermis layer may be greater than a hardness of the imitation Merkel cell layer and/or the imitation Ruffini corpuscle layer, so as to protect the imitation Merkel cell layer and/or the imitation Ruffini corpuscle layer, and may better simulate the structure of human skin.

In the present disclosure, the imitation epidermis layer may better fit the morphological and functional characteristics of the human skin by using liquid silicone rubber materials with different hardnesses, reducing an influence of the force information acquisition layer on a volume and weight of the robot itself, and may perceive the external multi-dimensional, nonlinear force stimulus more accurately.

Optionally, as shown in FIG. 3, FIG. 3 is a yet another schematic structural diagram of a device for acquiring a force information based on a bionic structure provided by the present disclosure.

The device further includes: a robotic arm, a serial port connecting line, a data processing device and a force information display device.

The robotic arm is used to connect the magnetic field signal acquisition chip.

The serial port connecting line is connected with the magnetic field signal acquisition chip, the serial port connecting line is connected with the data processing device, and the serial port connecting line is used to transmit an electrical signal converted by the magnetic field signal acquisition chip to the data processing device.

The data processing device is used to determine a display information of a first force information based on the electrical signal, and transmit the display information to the force information display device.

Optionally, a processor of the data processing device may be an Intel i7-10700, and the data processing device may run on a platform with a RAM of 16.00 GB, and a regression algorithm is used to regress a preprocessed dynamic electrical signal to obtain a force information of an external force.

The force information display device is used to display the display information of the first force information.

Optionally, the force information display device may be a 27-inch wide screen, which uses a visualization method to display the force information according to the force information of the external force acquired through regression.

Optionally, in the present disclosure, a robotic arm is used to be connected with the magnetic field signal acquisition chip, and the magnetic field signal acquisition chip converts an acquired magnetic field signal of a force information into a corresponding electrical signal. A serial port connecting line transmits the electrical signal transmitted by the magnetic field signal acquisition chip to a data processing device. The data processing device regresses the electrical signal after receiving the electrical signal, determines a display information of the first force information, and transmits the display information to the force information display device. The force information display device displays the received display information of the first force information.

Optionally, the display information of the first force information may include: a magnitude of the force, a direction of the force, a rotation angle of the force, a rotation speed of the force, a rotation direction of the force, and the like.

In the present disclosure, the force information acquired by the force information acquisition layer is converted and regressed through the serial port connection line, the data processing device and the force information display device, and is displayed in the force information display device, so that the user may have a more intuitive and clear feeling on the force information received by the force information acquisition layer.

Optionally, the magnetic field signal acquisition chip in the force information acquisition layer may be fixed on an outer surface of the robotic arm. During an interaction between the robotic arm and an external environment, the force information acquisition layer may acquire an effect of external force stimulus on the robotic arm, which may enhance the robot's perception of external stimulus and improve a success rate of the robot in completing a corresponding task during the interaction. Meanwhile, the force information of the external force is displayed through an information display module, which is convenient for subsequent analysis and processing.

Optionally, the magnetic field signal acquisition chip may also be fixed on other robotic apparatuses.

Optionally, directions of the external force stimulus may include three directions of X, Y and Z in space. A plane formed by the X and Y directions may be parallel to the plane where the magnetic field signal acquisition chip is located, and a force in the X direction and the Y direction may be a tangential force. The Z direction may be perpendicular to the plane where the magnetic field signal acquisition chip is located, and the force in the Z direction may be a normal force.

Optionally, when the external environment exerts the force stimulus on the force information acquisition layer, the imitation epidermis layer in contact with the external environment may generate a deformation, and the deformation may be enhanced through the double-sided protrusion on the imitation epidermis layer, and is transmitted toward the imitation Merkel cells layer and/or the imitation Ruffini corpuscle layer. A change of a spatial position of the cylindrical permanent magnet in the imitation Merkel cell layer causes a change of a magnetic field strength, and the magnetic field signal acquisition chip acquires a magnetic field signal of the magnetic induction in the Z direction. When a tangential force is perceived, the imitation Ruffini corpuscle layer may generate a deformation, causing a spatial position of the elongated permanent magnet to change, causing a magnetic field strength of the elongated permanent magnet to change, and the magnetic field signal acquisition chip acquires magnetic induction field signals in the X and Y directions.

In the present disclosure, the force is divided into forces of three directions through the three directions X, Y and Z, so as to implement a perception of the multi-dimensional force.

In the present disclosure, the force information acquisition layer may generate a deformation after being subjected to a force, the permanent magnet embedded in the force information acquisition layer moves with the deformation, thereby generating a magnetic field signal corresponding to the force information, which may perceive a multi-dimensional information of the force accurately, and the magnetic field signal is converted into an electrical signal that is easily manifested through a magnetic field signal acquisition chip arranged in parallel with the force information acquisition layer, so as to implement an accurate and efficient acquisition and perception of the multi-dimensional information of the force.

A system for acquiring a force information based on the bionic structure provided by the present disclosure is described below. The system for acquiring a force information based on the bionic structure described below and the device for acquiring a force information based on the bionic structure described above may be referred to each other correspondingly.

The disclosure provides a system for acquiring a force information based on a bionic structure, and the system includes: a force information acquisition layer and a magnetic field signal acquisition chip.

A permanent magnet is embedded in the force information acquisition layer.

The force information acquisition layer has an elastic structure, which is used to generate a deformation corresponding to a first force information of the force after being subjected to the force, so that the permanent magnet moves with the deformation to generate a magnetic field signal corresponding to the force information.

The magnetic field signal acquisition chip is arranged in parallel with the force information acquisition layer, and is used to acquire the magnetic field signal and convert the magnetic field signal into an electrical signal.

Optionally, the force information acquisition layer includes an imitation Merkel cells layer and/or an imitation Ruffini corpuscle layer.

The imitation Merkel cell layer is used to generate a deformation corresponding to a second force information of a normal force after being acted by a normal force, so that the permanent magnets in the imitation Merkel cell layer moves with the deformation to generate a magnetic field signal corresponding to the second force information;

The imitation Ruffini corpuscle layer is used to generate a deformation corresponding to a third force information of a tangential force after being acted by the tangential force, so that a permanent magnet in the imitation Ruffini corpuscle layer moves with the deformation to generate a magnetic field signal corresponding to the third force information.

Optionally, the force information acquisition layer further includes: an imitation epidermis layer.

The imitation epidermis layer covers an outside of the imitation Merkel cell layer and/or the imitation Ruffini corpuscle layer, and an outer surface of the imitation epidermis layer includes a plurality of protrusions; and the imitation epidermis layer is used to transmit a force to the imitation Merkel cell layer and/or the imitation Ruffini corpuscle layer after being subjected to the force.

Optionally, the force information acquisition layer is made of a liquid silicone rubber.

A hardness of the imitation epidermis layer is greater than a hardness of the imitation Merkel cell layer and/or the imitation Ruffini corpuscle layer.

The system further includes: a robotic arm, a serial port connecting line, a data processing device and a force information display device.

The robotic arm is used to connect the magnetic field signal acquisition chip.

The serial port connecting line is connected with the magnetic field signal acquisition chip, the serial port connecting line is connected with the data processing device, and the serial port connecting line is used to transmit an electrical signal converted by the magnetic field signal acquisition chip to the data processing device.

The data processing device is used to determine a display information of a first force information based on the electrical signal, and transmit the display information to the force information display device.

The force information display device is used to display the display information of the first force information.

In the present disclosure, the force information acquisition layer may generate a deformation after being subjected to a force, the permanent magnet embedded in the force information acquisition layer moves with the deformation, thereby generating a magnetic field signal corresponding to the force information, which may perceive a multi-dimensional information of the force accurately, and the magnetic field signal is converted into an electrical signal that is easily manifested through a magnetic field signal acquisition chip arranged in parallel with the force information acquisition layer, so as to implement an accurate and efficient acquisition and perception of the multi-dimensional information of the force.

The method of acquiring a force information based on a bionic structure provided by the present disclosure will be described below. The method of acquiring a force information based on a bionic structure described below and the force information acquisition device based on a bionic structure described above may refer to each other correspondingly.

FIG. 4 is a schematic flowchart of a method of acquiring a force information based on a bionic structure provided by the present disclosure. As shown in FIG. 4, the method includes the following steps:

Step 410: after a force information acquisition layer of a device for acquiring a force information based on a bionic structure is subjected to a force, a deformation corresponding to a first force information of the force is generated, so that a permanent magnet in the force information acquisition layer moves with the deformation to generate a magnetic field signal corresponding to the force information;

Step 420, a magnetic field signal is acquired, and the magnetic field signal is converted into an electrical signal through a magnetic field signal acquisition chip of the device for acquiring a force information based on a bionic structure.

In the present disclosure, the force information acquisition layer may generate a deformation after being subjected to a force, the permanent magnet embedded in the force information acquisition layer moves with the deformation, thereby generating a magnetic field signal corresponding to the force information, which may perceive a multi-dimensional information of the force accurately, and the magnetic field signal is converted into an electrical signal that is easily manifested through a magnetic field signal acquisition chip arranged in parallel with the force information acquisition layer, so as to implement an accurate and efficient acquisition and perception of the multi-dimensional information of the force.

Optionally, the force information acquisition layer includes an imitation Merkel cells layer and/or an imitation Ruffini corpuscle layer.

Correspondingly, the "after a force information acquisition layer of a device for acquiring a force information based on a bionic structure is subjected to a force, a deformation corresponding to a first force information of the force is generated, so that a permanent magnet in the force information acquisition layer moves with the deformation to generate a magnetic field signal corresponding to the force information" includes at least one of the following:

The imitation Merkel cell layer is used to generate a deformation corresponding to a second force information of a normal force after being acted by a normal force, so that the permanent magnets in the imitation Merkel cell layer moves with the deformation to generate a magnetic field signal corresponding to the second force information;

The imitation Ruffini corpuscle layer is used to generate a deformation corresponding to a third force information of a tangential force after being acted by the tangential force, so that a permanent magnet in the imitation Ruffini corpuscle layer moves with the deformation to generate a magnetic field signal corresponding to the third force information.

Optionally, the force information acquisition layer further includes: an imitation epidermis layer. The imitation epidermis layer may enhance a force through a plurality of protrusions on an outer surface of the imitation epidermis layer after being subjected to the force.

The enhanced force is transmitted to the imitation Merkel cells layer and/or the imitation Ruffini corpuscle layer.

Optionally, the method further includes:

The electrical signal is transmitted to the signal processing unit through the serial port connecting line.

A display information of a first force information is determined through the data processing device based on the electrical signal, and the display information is transmitted to the force information display device.

The display information of the first force information is displayed through the force information display device.

Optionally, the method further includes: the magnetic field acquisition chip is connected through the robotic arm.

In the present disclosure, the force information acquisition layer may generate a deformation after being subjected to a force, the permanent magnet embedded in the force information acquisition layer moves with the deformation, thereby generating a magnetic field signal corresponding to the force information, which may perceive a multi-dimensional information of the force accurately, and the magnetic field signal is converted into an electrical signal that is easily manifested through a magnetic field signal acquisition chip arranged in parallel with the force information acquisition layer, so as to implement an accurate and efficient acquisition and perception of the multi-dimensional information of the force.

Finally, it should be noted that the above embodiments are only used to illustrate the technical solution of the present disclosure rather than limiting them. Although the present disclosure has been described in detail with reference to the foregoing embodiments, those of ordinary skill in the art should understand: modifications may be made to the technical solutions described in the foregoing embodiments, or some technical features thereof may be equivalently replaced; and the modifications or replacements do not make the essence of the corresponding technical solutions depart from the spirit and scope of the technical solutions of the embodiments of the present disclosure.

What is claimed is:

1. A device for acquiring a force information, comprising:
   a force information acquisition layer and a magnetic field signal acquisition chip;
   wherein a permanent magnet is embedded in the force information acquisition layer;
   wherein the force information acquisition layer has an elastic structure configured to generate a deformation corresponding to a first force information of a force after being subjected to the force, so that the permanent magnet moves with the deformation to generate a magnetic field signal corresponding to the force information;
   wherein the magnetic field signal acquisition chip is arranged in parallel with the force information acquisition layer, and is configured to acquire the magnetic field signal and convert the magnetic field signal into an electrical signal,
   wherein the force information acquisition layer comprises an imitation Merkel cell layer and/or an imitation Ruffini corpuscle layer;
   wherein the imitation Merkel cell layer is configured to generate a deformation corresponding to a second force information of a normal force after being acted by the normal force, so that the permanent magnet in the imitation Merkel cell layer moves with the deformation to generate a magnetic field signal corresponding to the second force information;
   wherein the imitation Ruffini corpuscle layer is configured to generate a deformation corresponding to a third force information of a tangential force after being acted by the tangential force, so that the permanent magnet in the imitation Ruffini corpuscle layer moves with the deformation to generate a magnetic field signal corresponding to the third force information,
   wherein the force information acquisition layer further comprises: an imitation epidermis layer;
   wherein the imitation epidermis layer covers an outside of the imitation Merkel cell layer and/or the imitation Ruffini corpuscle layer, an outer surface of the imitation epidermis layer comprises a plurality of protrusions; and the imitation epidermis layer is configured to transmit a force to the imitation Merkel cell layer and/or the imitation Ruffini corpuscle layer after being subjected to the force,
   wherein the force information acquisition layer is made of a liquid silicone rubber;
   wherein a hardness of the imitation epidermis layer is greater than a hardness of the imitation Merkel cell layer and/or the imitation Ruffini corpuscle layer,
   wherein the imitation Merkel cell layer comprises cylindrical permanent magnets, and the cylindrical permanent magnets are evenly distributed in the imitation Merkel cell layer; and the imitation Ruffini corpuscle layer comprises elongated permanent magnets, and the elongated permanent magnets are evenly distributed in the imitation Ruffini corpuscle layer.

2. A system for acquiring a force information, wherein the system comprises the device according to claim 1;
   wherein the system further comprises: a robotic arm, a serial port connecting line, a data processing device and a force information display device;
   wherein the robotic arm is configured to connect the magnetic field signal acquisition chip;
   wherein the serial port connecting line is connected with the magnetic field signal acquisition chip, the serial port connecting line is connected with the data processing device, and the serial port connecting line is configured to transmit an electrical signal converted by the magnetic field signal acquisition chip to the data processing device;
   wherein the data processing device is configured to determine a display information of a first force information based on the electrical signal, and transmit the display information to the force information display device;
   wherein the force information display device is configured to display the display information of the first force information.

3. A method for acquiring a force information, comprising:
   generating a deformation corresponding to a first force information of a force after a force information acquisition layer of the device according to claim 1 being subjected to the force, so that a permanent magnet in the force information acquisition layer moves with the deformation to generate a magnetic field signal corresponding to the force information;
acquiring the magnetic field signal and converting the magnetic field signal into an electrical signal, through a magnetic field signal acquisition chip of the device according to claim 1.

4. The method according to claim 3, wherein the force information acquisition layer comprises an imitation Merkel cell layer and/or an imitation Ruffini corpuscle layer;
the generating a deformation corresponding to a first force information of a force after a force information acquisition layer being subjected to the force, so that a permanent magnet in the force information acquisition layer moves with the deformation to generate a magnetic field signal corresponding to the force information comprises at least one of:
the imitation Merkel cell layer is configured to generate a deformation corresponding to a second force information of a normal force after being acted by a normal force, so that the permanent magnet in the imitation Merkel cell layer moves with the deformation to generate a magnetic field signal corresponding to the second force information;
the imitation Ruffini corpuscle layer is configured to generate a deformation corresponding to a third force information of a tangential force after being acted by the tangential force, so that a permanent magnet in the imitation Ruffini corpuscle layer moves with the deformation to generate a magnetic field signal corresponding to the third force information.

5. The method according to claim 3, wherein the force information acquisition layer further comprises: an imitation epidermis layer, and the imitation epidermis layer is configured to transmit a force to the imitation Merkel cell layer and/or the imitation Ruffini corpuscle layer after being subjected to the force.

6. The method according to claim 3, further comprising:
transmitting the electrical signal to a signal processing unit through a serial port connecting line;
determining a display information of the first force information based on the electrical signal through a data processing device, and transmitting the display information to a force information display device;
displaying the display information of the first force information through the force information display device.

7. The method according to claim 3, further comprising:
connecting the magnetic field acquisition chip through a robotic arm.

* * * * *